US006041294A

United States Patent [19]

Beerends

[11] Patent Number: 6,041,294

[45] **Date of Patent: *Mar. 21, 2000**

[54] SIGNAL QUALITY DETERMINING DEVICE AND METHOD

[75] Inventor: John Gerard Beerends, The Hague, Netherlands

[73] Assignee: Koninklijke PTT Nederland N.V., Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/913,039

[22] PCT Filed: Mar. 13, 1996

[86] PCT No.: PCT/EP96/01143

§ 371 Date: Sep. 5, 1997

§ 102(e) Date: Sep. 5, 1997

[87] PCT Pub. No.: WO96/28950

PCT Pub. Date: Sep. 19, 1996

[30] Foreign Application Priority Data

Mar. 15, 1995 [NL] Netherlands ........................... 9500512

[51] Int. Cl.[7] ............................ G01L 21/02; H04B 15/00

[52] U.S. Cl. ............................ 704/203; 704/501; 702/69; 702/195

[58] Field of Search .................................... 704/500, 501, 704/502, 503, 504, 205, 211, 203; 702/69, 189, 198, 194, 195; 381/94.2

[56] References Cited

U.S. PATENT DOCUMENTS 4,860,360 8/1989 Boggs .
5,588,089 12/1996 Beerends et al. ....................... 704/205
5,687,281 11/1997 Beerends et al. ....................... 704/203

FOREIGN PATENT DOCUMENTS 0417739 3/1991 European Pat. Off. .
0627727 5/1994 European Pat. Off. .
3708002 9/1988 Germany .

OTHER PUBLICATIONS

Beerends, et al, "A Perceptual Speech–Quality Measure Based on a Psychoacoustic Sound Representation", *Journal of the Audio Engineering Society*, vol. 42, No. 3, Mar. 1994, pp. 115–123.

Beerends, et al, "A Perceptual Audio Quality Measure Based on a Psychoacoustic Sound Representation", *Journal of the Audio Engineering Society*, vol. 40, No. 12, Dec. 1992, pp. 963–978.

Beerends, et al, "Modelling a Cognitive Aspect in the Measurement of the Quality of Music Codes", *An Audio Engineering Society Preprint*, presented at the 96th Convention, Feb. 26 –Mar. 1, 1994, pp. 1–13.

*Primary Examiner*—David R. Hudspeth
*Assistant Examiner*—Martin Lerner
*Attorney, Agent, or Firm*—Michaelson & Wallace; Peter L. Michaelson

[57] ABSTRACT

A device for determining the quality of an output signal to be generated by a signal processing circuit with respect to a reference signal. The device is provided with a first series circuit for receiving the output signal and a second series circuit for receiving the reference signal. The device generates an objective quality signal through a combining circuit which is coupled to the two series circuits. Poor correlation between the objective quality and subjective quality signals, the latter which will be assessed by human observers, can be considerably improved by a differential arrangement present in the combining circuit. This arrangement determines a difference between the two series circuit signals and reduces this difference by a certain value, preferably one that is a function of a series circuit signal. Poor correlation can be improved further by disposing a scaling circuit, between the two series circuits, for scaling at least one series circuit signal. Furthermore, the quality signal can also be scaled as a function of the scaling circuit.

20 Claims, 3 Drawing Sheets

SIGNAL QUALITY DETERMINING DEVICE AND METHOD

A BACKGROUND OF THE INVENTION

Figure 1:
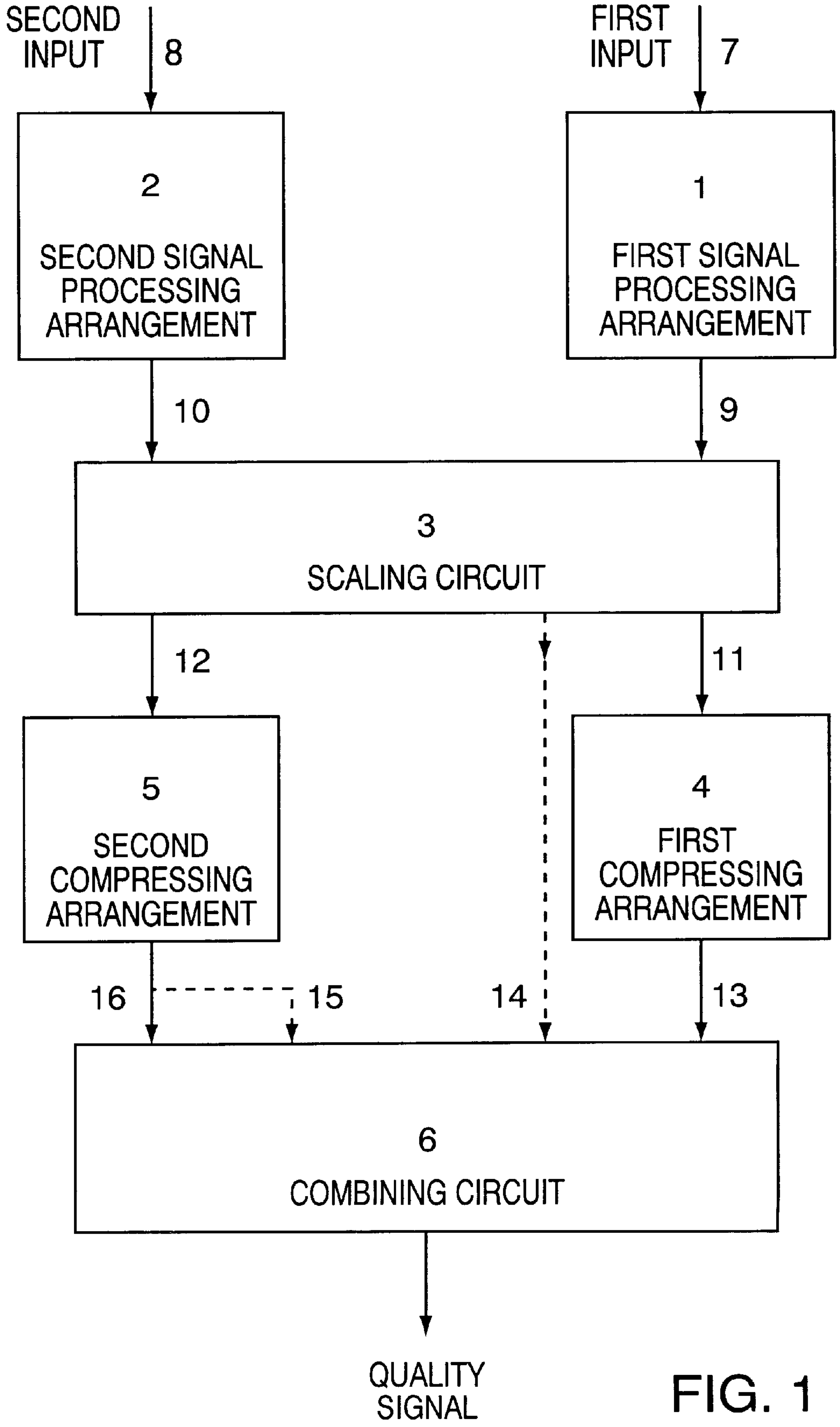

The invention relates to a device for determining the quality of an output signal to be generated by a signal processing circuit with respect to a reference signal, which device is provided with a first series circuit having a first input for receiving the output signal and is provided with a second series circuit having a second input for receiving the reference signal and is provided with a combining circuit, coupled to a first output of the first series circuit and to a second output of the second series circuit, for generating a quality signal, which first series circuit is provided with a first signal processing arrangement, coupled to the first input of the first series circuit, for generating a first signal parameter as a function of time and frequency, and a first compressing arrangement, coupled to the first signal processing arrangement, for compressing a first signal parameter and for generating a first compressed signal parameter, which second series circuit is provided with a second compressing arrangement, coupled to the second input, for generating a second compressed signal parameter, which combining circuit is provided with a differential arrangement, coupled to the two compressing arrangements, for determining a differential signal on the basis of the compressed signal parameters, and an integrating arrangement, coupled to the differential arrangement, for generating the quality signal by integrating the differential signal with respect to time and frequency.

Such a device is disclosed in the first reference: J. Audio Eng. Soc., Vol. 40, No. 12, Dec. 1992, in particular "A Perceptual Audio Quality Measure Based on a Psychoacoustic Sound Representation" by John G. Beerends and Jan A. Stemerdink, pages 963–978, more particularly FIG. 7. The device described therein determines the quality of an output signal to be generated by a signal processing circuit, such as, for example, a coder/decoder, or codec, with respect to a reference signal. The reference signal is, for example, an input signal to be presented to the signal processing circuit, although the possibilities also include using, as the reference signal, a pre-calculated ideal version of the output signal. The first signal parameter is generated as a function of time and frequency by means of the first signal processing arrangement, associated with the first series circuit, in response to the output signal, after which the first signal parameter is compressed by means of the first compressing arrangement associated with the first series circuit. In this connection, intermediate operational processing of the first signal parameter should not be ruled out at all. The second signal parameter is compressed by means of the second compressing arrangement, associated with the second series circuit, in response to the reference signal. In this case too, further operational processing of the second signal parameter should not be ruled out at all. Of both compressed signal parameters, the differential signal is determined by means of the differential arrangement associated with the combining circuit, after which the quality signal is generated by integrating the differential signal with respect to time and frequency by means of the integrating arrangement associated with the combining circuit.

Such a device has, inter alia, the disadvantage that the objective quality signal, to be assessed by means of the device, and a subjective quality signal, to be assessed by human observers, have a poor correlation with each other.

B SUMMARY OF THE INVENTION

The object of the invention is, inter alia, to provide a device in which the objective quality signal which is to be assessed by means of the device, and a subjective quality signal, which is to be assessed by human observers have an improved correlation with each other.

For this purpose, the device according to the invention has the characteristic that the differential arrangement is provided with an adjusting arrangement, for reducing the amplitude of the differential signal.

The invention is based, inter alia, on the insight that the poor correlation between objective quality signals, to be assessed by means of known devices, and subjective quality signals, to be assessed by human observers, is the consequence, inter alia, of the fact that certain distortions are found to be more objectionable by human observers than other distortions. This poor correlation is improved by using the two compressing arrangements, and is furthermore based, inter alia, on the insight that the two compressing arrangements do not function optimally, as a consequence of which the amplitude of the differential signal can be reduced, i.e. adjusted, for example by subtracting a signal having a constant value.

The problem of the poor correlation is thus solved by providing the differential arrangement with the adjusting arrangement.

A first embodiment of the device according to the invention has the characteristic that the adjusting arrangement is coupled to a series circuit for reducing the amplitude of the differential signal in dependence of a series circuit signal.

As a result of reducing the amplitude of the differential signal in dependence of a series circuit signal, the reduction becomes dependent upon the output signal or the reference signal, to some extent, which improves the correlation.

A second embodiment of the device according to the invention has the characteristic that the device comprises a scaling circuit which is situated between the first series circuit and the second series circuit, which scaling circuit is provided with a further integrating arrangement for integrating a first series circuit signal and a second series circuit signal with respect to frequency so as to generate two integrated series circuit signals, and a comparing arrangement, coupled to the further integrating arrangement, for comparing the two integrated series circuit signals and for scaling at least one series circuit signal in response to the comparison.

As a result of providing the device with the scaling circuit which is situated between the first series circuit and the second series circuit and which comprises the further integrating arrangement and the comparing arrangement, the two series circuit signals are integrated with respect to frequency and then compared, after which at least one series circuit signal is scaled in response to the comparison. The scaling implies increasing or reducing the amplitude of one series circuit signal with respect to the other or increasing and/or reducing the two series circuit signals with respect to one another. The scaling and takes place between the two series circuits, after which an amplitude amplifier/attenuator is controlled, in at least one series circuit, from the comparing arrangement. Due to the further scaling, good correlation is obtained between the objective quality signal, to be assessed by means of the device, and a subjective quality signal, to be assessed by human observers.

The invention is furthermore based, inter alia, on the insight that the two compressing arrangements function better as a result of using the scaling circuit, which further improves the correlation.

It should be pointed out that the use of the scaling circuit can be viewed completely separately from the use of the adjusting arrangement. Even if known devices are merely expanded with the scaling circuit alone, the poor correlation will in fact be improved to no small degree.

A third embodiment of the device according to the invention has the characteristic that the second series circuit is furthermore provided with a second signal processing arrangement, coupled to the second input, for generating a second signal parameter as a function of both time and frequency, the second compressing arrangement being coupled to the second signal processing arrangement in order to compress the second signal parameter.

If the second series circuit is furthermore provided with the second signal processing arrangement, the second signal parameter is generated as a function of both time and frequency. In this case, the input signal to be presented to the signal processing circuit, such as, for example, a coder/decoder, or codec, whose quality is to be determined, is used as the reference signal, in contrast to when a second signal processing arrangement is not used, in which case a pre-calculated ideal version of the output signal should be used as the reference signal.

A fourth embodiment of the device according to the invention has the characteristic that a signal processing arrangement is provided with a multiplying, arrangement for multiplying in the time domain, a signal to be fed to an input of the signal processing arrangement, by a window function, and a transforming arrangement, coupled to the multiplying arrangement, for transforming a signal originating from the multiplying arrangement to the frequency domain, which transforming arrangement generates, after determining an absolute value, a signal parameter as a function of time and frequency.

In this connection, the signal parameter is generated as a function of time and frequency by the first and/or second signal processing arrangement as a result of using the multiplying arrangement and the transforming arrangement, which transforming arrangement also performs, for example, the absolute-value determination.

A fifth embodiment of the device according to the invention has the characteristic that a signal processing arrangement is provided with a subband filtering arrangement for filtering a signal to be fed to an input of the signal processing arrangement, which subband filtering arrangement generates, after determining an absolute value, a signal parameter as a function of time and frequency.

In this connection, the signal parameter is generated as a function of time and frequency by the first and/or second signal processing arrangement as a result of using the subband filtering arrangement which also performs, for example, an absolute-value determination.

A sixth embodiment of the device according to the invention has the characteristic that the signal processing arrangement is furthermore provided with a converting arrangement for converting a signal parameter represented by means of a time spectrum and a frequency spectrum to a signal parameter represented by means of a time spectrum and a Bark spectrum.

In this connection, the signal parameter generated by the first and/or second signal processing arrangement and represented by means of a time spectrum and a frequency spectrum is converted into a signal parameter represented by means of a time spectrum and a Bark spectrum by using the converting arrangement.

The invention furthermore relates to a method for determining the quality of an output signal to be generated by a signal processing circuit with respect to a reference signal, which method comprises the following steps of generating a first signal parameter as a function of time and frequency in response to the output signal, compressing a first signal parameter and generating a first compressed signal parameter, generating a second compressed signal parameter in response to the reference signal, determining a differential signal on the basis of the compressed signal parameters, and generating a quality signal by integrating the differential signal with respect to time and frequency.

The method according to the invention has the characteristic that the method comprises the step of reducing the amplitude of the differential signal.

A first embodiment of the method according to the invention has the characteristic that the method comprises the step of reducing the amplitude of the differential signal in dependence of at least either a first signal to be generated in response to the output signal or a second signal to be generated in response to the reference signal.

A second embodiment of the method according to the invention has the characteristic that the method furthermore comprises the following steps of integrating, with respect to frequency, a further first signal to be generated in response to the output signal and a further second signal to be generated in response to the reference signal, comparing the integrated further first signal and the integrated further second signal, and scaling at least one of the further first signal and the further second signal in response to the comparison.

A third embodiment of the method according to the invention has the characteristic that the step of generating a second compressed signal parameter in response to the reference signal comprises the following two steps of generating a second signal parameter in response to the reference signal as a function of both time and frequency, and compressing a second signal parameter.

A fourth embodiment of the method according to the invention has the characteristic that the step of generating a first signal parameter in response to the output signal as a function of time and frequency comprises the following two steps of multiplying in the time domain a still further first signal to be generated in response to the output signal by a window function, and transforming the still further first signal to be multiplied by the window function to the frequency domain, which represents, after determining an absolute value, a signal parameter as a function of time and frequency.

A fifth embodiment of the method according to the invention has the characteristic that the step of generating a first signal parameter in response to the output signal as a function of time and frequency comprises the following step of filtering a still further first signal to be generated in response to the output signal, which represents, after determining an absolute value, a signal parameter as a function of time and frequency.

A sixth embodiment of the method according to the invention has the characteristic that the step of generating a first signal parameter in response to the output signal as a function of time and frequency also comprises the following step of converting a signal parameter represented by means of a time spectrum and a frequency spectrum to a signal parameter represented by means of a time spectrum and a Bark spectrum.

C REFERENCES

J. Audio Eng. Soc., Vol. 40, No. 12, December 1992, in particular, "A Perceptual Audio Quality Measure Based on a Psychoacoustic Sound Representation" by John G. Beerends and Jan A. Stemerdink, pages 963–978 (hereinafter the "Beerends et al publication")

"Modelling a Cognitive Aspect in the Measurement of the Quality of Music Codecs", by John G. Beerends and Jan A. Stemerdink, presented at the 96th Convention Feb. 26–Mar. 1, 1994, Amsterdam U.S. Pat. No. 4,860,360

EP 0 627 727

EP 0 417 739

DE 37 08 002

All the references including the literature cited in these references are deemed to be incorporated by reference herein.

D BRIEF DESCRIPTION OF THE DRAWINGS

Figure 2:
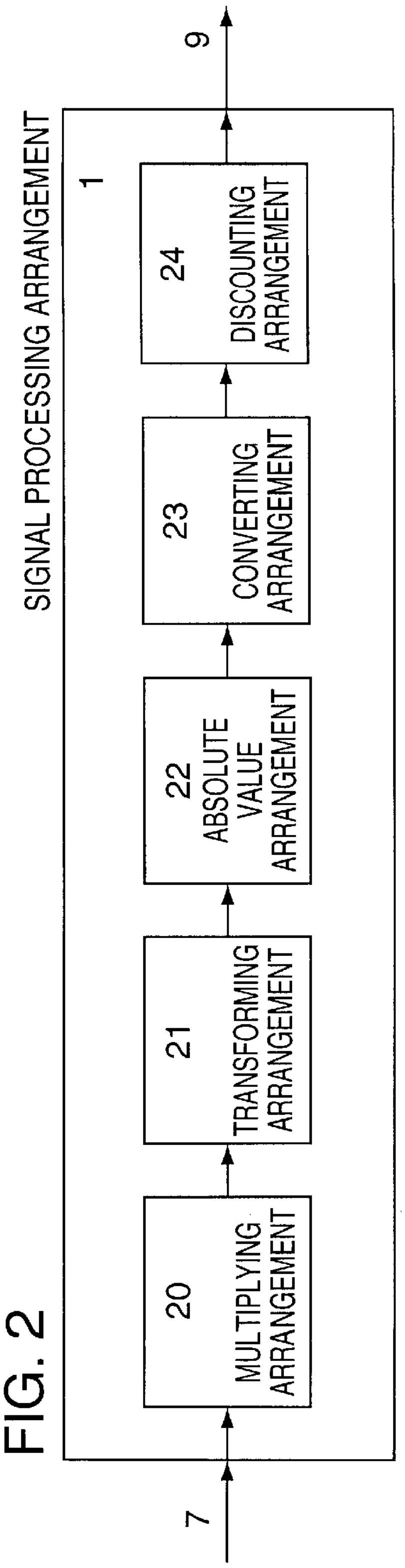
Figure 3:
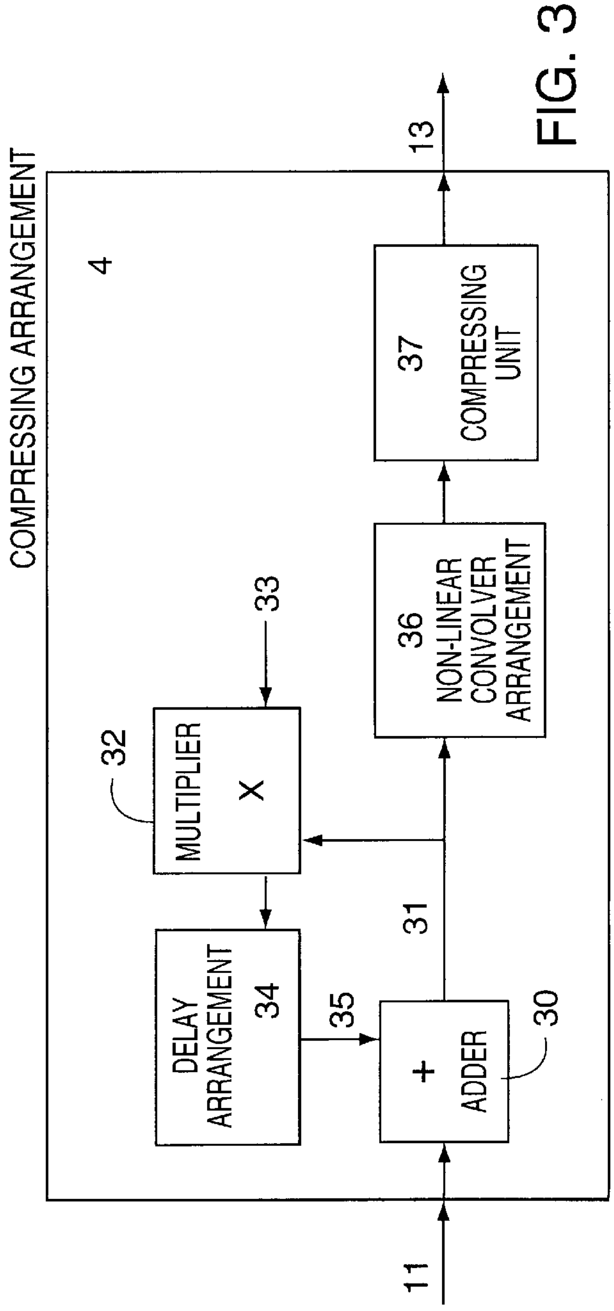
Figure 4:
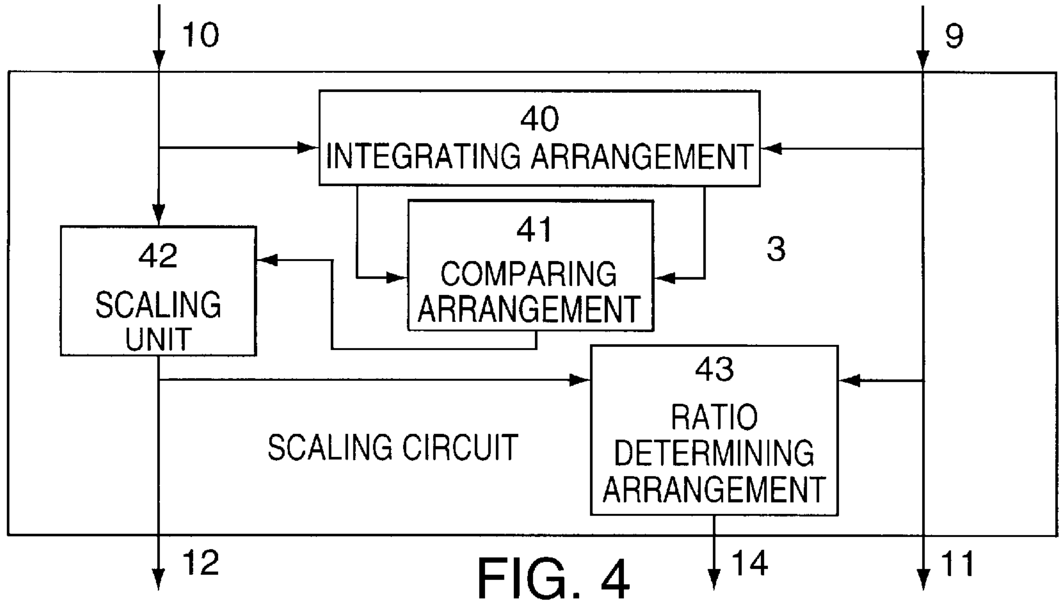
Figure 5:
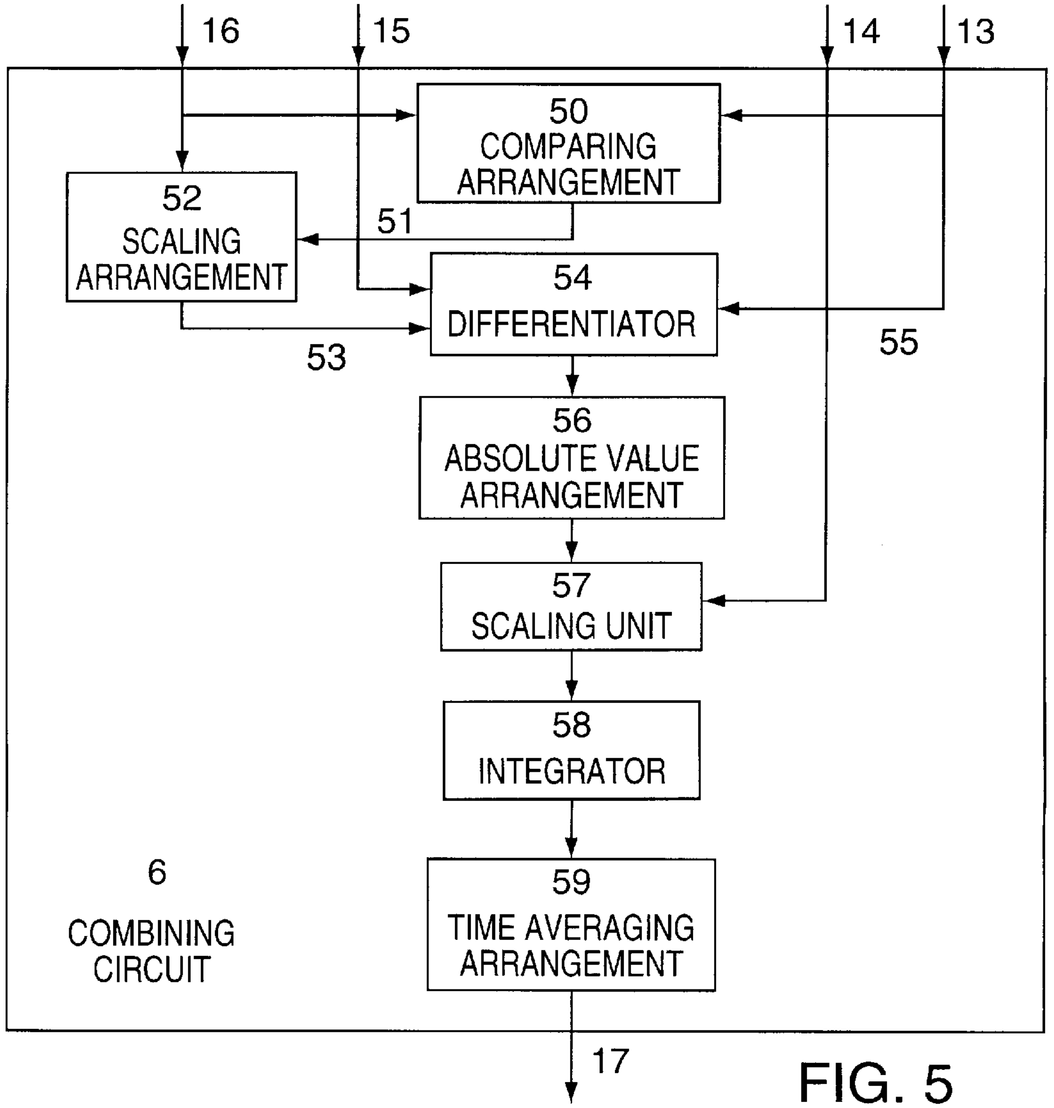

The invention will be explained in greater detail by reference to an exemplary embodiment shown in the figures. In the figures:

FIG. 1 shows a device according to the invention, comprising known signal processing arrangements, known compressing arrangements, a scaling circuit according to the invention and a combining circuit according to the invention, FIG. 2 shows a known signal processing arrangement for use in the device according to the invention, FIG. 3 shows a known compressing arrangement for use in the device according to the invention, FIG. 4 shows a scaling circuit according to the invention for use in the device according to the invention, and FIG. 5 shows a combining circuit according to the invention for use in the device according to the invention.

E. DETAILED DESCRIPTION

The device according to the invention shown in FIG. 1 comprises a first signal processing arrangement 1 having a first input 7 for receiving an output signal originating from a signal processing circuit such as, for example, a coder/decoder, or codec. A first output of first signal processing arrangement 1 is connected via a coupling 9 to a first input of a scaling circuit 3. The device according to the invention furthermore comprises a second signal processing arrangement 2 having a second input 8 for receiving an input signal to be fed to the signal processing circuit such as, for example, the coder/decoder, or codec. A second output of second signal processing arrangement 2 is connected via a coupling 10 to a second input of scaling circuit 3. A first output of scaling circuit 3 is connected via a coupling 11 to a first input of a first compressing arrangement 4, and a second output of scaling circuit 3 is connected via a coupling 12 to a second input of a second compressing arrangement 5. A first output of first compressing arrangement 4 is connected via a coupling 13 to a first input of a combining circuit 6, and a second output of second compressing arrangement 5 is connected via a coupling 16 to a second input of combining circuit 6. A third output of scaling circuit 3 is connected via a coupling 14 to a third input of combining circuit 6, and the second output of second compressing arrangement 5, or coupling 16, is connected via a coupling 15 to a fourth input of combining circuit 6 which has an output 17 for generating a quality signal. First signal processing arrangement 1 and first compressing arrangement 4 jointly correspond to a first series circuit, and second signal processing arrangement 2 and second compressing arrangement 5 jointly correspond to a second series circuit.

The known first (or second) signal processing arrangement 1 (or 2) shown in FIG. 2 comprises a first (or second) multiplying arrangement 20 for multiplying in the time domain the output signal (or input signal) to be fed to the first input 7 (or second input 8) of the first (or second) signal processing arrangement 1 (or 2) and originating from the signal processing circuit such as, for example, the coder/decoder, or codec, by a window function, a first (or second) transforming arrangement 21, coupled to the first (or second) multiplying arrangement 20, for transforming the signal originating from the first (or second) multiplying arrangement 20 to the frequency domain, a first (or second) absolute-value arrangement 22 for determining the absolute value of the signal originating from the first (or second) transforming arrangement 21 for generating a first (or second) positive signal parameter as a function of time and frequency, a first (or second) converting arrangement 23 for converting the first (or second) positive signal parameter originating from the first (or second) absolute-value arrangement 22 and represented by means of a time spectrum and a frequency spectrum into a first (or second) signal parameter represented by means of a time spectrum and a Bark spectrum, and a first (or second) discounting arrangement 24 for discounting a hearing function in the case of the first (or second) signal parameter originating from the first (or second) converting arrangement and represented by means of a time spectrum and a Bark spectrum, which signal parameter is then transmitted via the coupling 9 (or 10).

The known first (or second) compressing arrangement 4 (or 5) shown in FIG. 3 receives via coupling 11 (or 12) a signal parameter which is fed to a first (or second) input of a first (or second) adder 30, a first (or second) output of which is connected via a coupling 31, on the one hand, to a first (or second) input of a first (or second) multiplier 32 and, on the other hand, to a first (or second) nonlinear convoluting arrangement 36 which is furthermore connected to a first (or second) compressing unit 37 for generating via coupling 13 (or 16) a first (or second) compressed signal parameter. First (or second) multiplier 32 has a further first (or second) input for receiving a feed signal and has a first (or second) output which is connected to a first (or second) input of a first (or second) delay arrangement 34, a first (or second) output of which is coupled to a further first (or second) input of the first (or second) adder 30.

The scaling circuit 3 shown in FIG. 4 comprises a further integrating arrangement 40, a first input of which is connected to the first input of scaling circuit 3 and consequently to coupling 9 for receiving a first series circuit signal (the first signal parameter represented by means of a time spectrum and a Bark spectrum) and a second input of which is connected to the second input of scaling circuit 3 and consequently to coupling 10 for receiving a second series circuit signal (the second signal parameter represented by means of a time spectrum and a Bark spectrum). A first output of further integrating arrangement 40 for generating the integrated first series circuit signal is connected to a first input of a comparing arrangement 41 and a second output of further integrating arrangement 40 for generating the integrated second series circuit signal is connected to a second input of comparing arrangement 41. The first input of scaling circuit 3 is connected to the first output and, via scaling circuit 3, coupling 9 is consequently connected through to coupling 11. The second input of scaling circuit 3 is connected to a first input of a further scaling unit 42 and the second output of scaling of circuit 3 is connected to an output of further scaling unit 42 and, via scaling circuit 3, coupling 10 is consequently connected through to coupling 12 via further scaling unit 42. An output of comparing arrangement 41 for generating a control signal is connected to a control input of further scaling unit 42. The first input of scaling circuit 3, or coupling 9 or coupling 11, is connected to a first input of a ratio-determining arrangement 43 and the output of further scaling unit 42, or coupling 12, is connected to a second input of ratio-determining arrangement 43, an output of which is connected to the third output of scaling circuit 3 and consequently to coupling 14 for generating a further scaling signal.

The combining circuit 6 shown in FIG. 5 comprises a further comparing arrangement 50, a first input of which is connected to the first input of combining circuit 6 for receiving the first compressed signal parameter via coupling 13 and a second input of which is connected to the second input of combining circuit 6 for receiving the second compressed signal parameter via coupling 16. The first input of combining circuit 6 is furthermore connected to a first input of a differential arrangement 54,56. An output of further comparing arrangement 50 for generating a scaling signal is connected via a coupling 51 to a control input of scaling arrangement 52, an input of which is connected to the second input of combining circuit 6 for receiving the second compressed signal parameter via coupling 16 and an output of which is connected via a coupling 53 to a second input of differential arrangement 54,56 for determining a differential (difference) signal on the basis of the mutually scaled compressed signal parameters. A third input of the differential arrangement 54,56 is connected to the fourth input of the combining circuit 6 for receiving, via coupling 15, the second compressed signal parameter to be received via coupling 16. Differential arrangement 54,56 comprises a differentiator 54 for generating a differential (difference) signal and a further absolute-value arrangement 56 for determining the absolute value of the differential signal, an output of which is connected to an input of scaling unit 57, a control input of which is connected to the third input of combining circuit 6 for receiving the further scaling signal via coupling 14. An output of scaling unit 57 is connected to an input of an integrating arrangement 58,59 for integrating the scaled absolute value of the differential signal with respect to time and frequency. Integrating arrangement 58,59 comprises a series arrangement of an integrator 58 and a time-averaging arrangement 59, an output of which is connected to the output 17 of combining circuit 6 for generating the quality signal.

The operation of a known device for determining the quality of the output signal to be generated by the signal processing circuit such as, for example, the coder/decoder, or codec, which known device is formed without the scaling circuit 3 shown in greater detail in FIG. 4, the couplings 10 and 12 consequently being mutually connected through, and which known device is formed using a standard combining circuit 6, the third input, shown in greater detail in FIG. 5, of differential arrangement 54,56 and scaling unit 57 consequently being missing, is as follows and, indeed, as also described in the first reference.

The output signal of the signal processing circuit such as, for example, the coder/decoder, or codec, is fed to input 7, after which the first signal processing circuit 1 converts said output signal into a first signal parameter represented by means of a time spectrum and a Bark spectrum. This takes place by means of the first multiplying arrangement 20 which multiplies the output signal represented by means of a time spectrum by a window function represented by means of a time spectrum. Thereafter, the signal thus obtained and represented by means of a time spectrum is transformed by means of first transforming arrangement 21 to the frequency domain, for example by means of an FFT, or fast Fourier transform. Next, the absolute value of the signal thus obtained and represented by means of a time spectrum and a frequency spectrum is determined by means of the first absolute-value arrangement 22, for example by squaring. Then, the signal parameter thus obtained and represented by means of a time spectrum and a frequency spectrum is converted by means of first converting arrangement 23 into a signal parameter represented by means of a time spectrum and a Bark spectrum, for example by resampling on the basis of a nonlinear frequency scale, also referred to as Bark scale. The signal parameter is then adjusted by means of first discounting arrangement 24 to a hearing function, or is filtered, for example, by multiplying it by a characteristic represented by means of a Bark spectrum.

The first signal parameter thus obtained and represented by means of a time spectrum and a Bark spectrum is then converted by means of the first compressing arrangement 4 into a first compressed signal parameter represented by means of a time spectrum and a Bark spectrum. This takes place by means of first adder 30, first multiplier 32 and first delay arrangement 34. The signal parameter represented by means of a time spectrum and a Bark spectrum is multiplied by a feed signal represented by means of a Bark spectrum such as, for example, an exponentially decreasing signal. Next the signal parameter thus obtained and represented by means of a time spectrum and a Bark spectrum is added, with a delay in time, to the signal parameter represented by means of a time spectrum and a Bark spectrum. Then, the signal parameter thus obtained and represented by means of a time spectrum and a Bark spectrum is convoluted by means of first nonlinear convoluting arrangement 36 with a spreading function represented by means of a Bark spectrum, after which the signal parameter thus obtained and represented by means of a time spectrum and a Bark spectrum is compressed by means of first compressing unit 37.

In a corresponding manner, the input signal of the signal processing circuit such as, for example, the coder/decoder, or codec, is fed to input 8, after which the second signal processing circuit 2 converts said input signal into a second signal parameter represented by means of a time spectrum and a Bark spectrum, and the latter is converted by means of the second compressing arrangement 5 into a second compressed signal parameter represented by means of a time spectrum and a Bark spectrum.

The first and second compressed signal parameters, respectively, are then fed via the respective couplings 13 and 16 to combining circuit 6, it being assumed for the time being that this is a standard combining circuit which lacks the third input of differential arrangement 54,56 and scaling unit 57 shown in greater detail in FIG. 5. The two compressed signal parameters are integrated by further comparing arrangement 50 and mutually compared, after which further comparing arrangement 50 generates the scaling signal which represents, for example, the average ratio between the two compressed signal parameters. The scaling signal is fed to scaling arrangement 52 which, in response thereto, scales the second compressed signal parameter (that is to say, increases or reduces it as a function of the scaling signal). Obviously, scaling arrangement 52 could also be used, in a manner known to the person skilled in the art, for scaling the first compressed signal parameter instead of for scaling the second compressed signal parameter and use could furthermore be made, in a manner known to the person skilled in the art, of two scaling arrangements for mutually scaling the two compressed signal parameters at the same time. The differential signal is derived by means of differentiator 54 from the mutually scaled compressed signal parameters, the absolute value of which differential signal is then determined by means of further absolute-value arrangement 56. The signal thus obtained is integrated by means of integrator 58 with respect to a Bark spectrum and is integrated by means of time-averaging arrangement 59 with respect to a time spectrum and generated by means of output 17 as quality signal which indicates in an objective manner the quality of the signal processing circuit such as, for example, the coder/decoder or codec.

The operation of the device according to the invention for determining the quality of the output signal to be generated by the signal processing circuit such as, for example, the coder/decoder, or codec, which device according to the invention is consequently formed with the scaling circuit 3 shown in detail in FIG. 4. The couplings 10 and 12 are consequently coupled through mutually via further scaling unit, and which known device is formed with an expanded combining circuit 6 according to the invention to which the third input of differential arrangement 54,56 shown in greater detail in FIG. 5 and scaling unit 57 have consequently been added is as described above, supplemented by what follows.

The first series circuit signal (the first signal parameter represented by means of a time spectrum and a Bark spectrum) to be received via coupling 9 and the first input of scaling circuit 3 is fed to the first input of further integrating arrangement 40 and the second series circuit signal (the second signal parameter represented by means of a time spectrum and a Bark spectrum) to be received via the coupling 10 and the second input of scaling circuit 3 is fed to the second input of further integrating arrangement 40, which integrates the two series circuit signals with respect to frequency. Then, the integrated first series circuit signal is fed, via the first output of further integrating arrangement 40, to the first input of comparing arrangement 41 and the integrated second series circuit signal is fed, via the second output of further integrating arrangement 40, to the second input of comparing arrangement 41. The latter compares the two integrated series circuit signals and generates, in response thereto, the control signal which is fed to the control input of further scaling unit 42. The latter scales the second series circuit signal (the second signal parameter represented by means of a time spectrum and a Bark spectrum) to be received via coupling 10 and the second input of scaling circuit 3 as a function of the control signal (that is to say increases or reduces the amplitude of the second series circuit signal) and generates the thus scaled second series circuit signal via the output of further scaling unit 42 to the second output of scaling circuit 3. At the same time, the first input of scaling arrangement 3 is connected through in this example in a direct manner to the first output of scaling circuit 3. In this example, the first series circuit signal and the scaled second series circuit signal, respectively are passed via scaling circuit 3 to first compressing arrangement 4 and second compressing arrangement 5, respectively.

As a result of this further scaling, a good correlation is obtained between the objective quality signal to be assessed by means of the device according to the invention and a subjective quality signal to be assessed by human observers. This invention is based, inter alia, on the insight that the poor correlation between objective quality signals, to be assesssed by means of known devices, and subjective quality signals, to be assessed by human observers, is the consequence, inter alia, of the fact that certain distortions are found to be more objectionable by human observers than other distortions. Such poor correlation is improved by using the two compressing arrangements. The invention is furthermore based, inter alia, on the insight that, as a result of using scaling circuit 3, the two compressing arrangements 4 and 5 function better with respect to one another, which further improves the correlation. The problem of the poor correlation is consequently solved by an improved functioning of the two compressing arrangements 4 and 5 with respect to one another as a result of using scaling circuit 3.

As a result of the fact that the first input of scaling circuit 3, or coupling 9 or coupling 11, is connected to the first input of ratio-determining arrangement 43 and the output of further scaling unit 42, or coupling 12, is connected to the second input of ratio-determining arrangement 43, ratio-determining arrangement 43 is capable of assessing a mutual ratio of the first series circuit signal and the scaled second series circuit signal and of generating a further scaling signal as a function thereof by means of the output of ratio-determining arrangement 43. The further scaling signal is fed via the third output of scaling circuit 3 and consequently via coupling 14 to the third input of combining circuit 6. The further scaling signal is fed in combining circuit 6 to scaling unit 57 which scales, as a function of the further scaling signal, the absolute value of the differential signal originating from the differential arrangement 54,56 (that is to say increases or reduces the amplitude of said absolute value). As a consequence thereof, the already improved correlation is improved further as a result of the fact an (amplitude) difference still present between the first series circuit signal and the scaled second series circuit signal in the combining circuit is discounted and integrating arrangement 58,59 functions better as a result.

Another (and further) improvement of the correlation is obtained if differentiator 54 (or further absolute-value arrangement 56) is provided with an adjusting arrangement, not shown in the figures, which somewhat reduces the amplitude of the differential signal. Preferably, the amplitude of the differential signal is reduced as a function of a series circuit signal, just as in this example it is reduced as a function (for example 0.1% or 1% or 10% of (possibly the amplitude of) the series circuit signal) of the scaled and compressed second signal parameter originating from second compressing arrangement 5, as a result of which integrating arrangement 58,59 functions still better. As a result, the already very good correlation is improved still further. In case further absolute-value arrangement 56 is provided with such an adjusting arrangement, this adjusting arrangement could be in the form of a subtracting circuit which somewhat reduces the positive amplitude of the differential signal. In case differentiator 54 is provided with such an adjusting arrangement, then in case of a positive differential signal this adjusting arrangement should have a subtracting function, and in case of a negative differential signal this adjusting arrangement should have an adding function.

The components shown in FIG. 2 of first signal processing arrangement 1 are described, as stated earlier, adequately and in a manner known to the person skilled in the art in the first reference. A digital output signal which originates from the signal processing circuit such as, for example, the coder/decoder, or codec, and which is, for example, discrete both in time and in amplitude is multiplied by means of first multiplying arrangement 20 by a window function such as, for example, a so-called cosine square function represented by means of a time spectrum, after which the signal thus obtained and represented by means of a time spectrum is transformed by means of first transforming arrangement 21 to the frequency domain, for example by an FFT, or fast Fourier transform, after which the absolute value of the signal thus obtained and represented by means of a time spectrum and a frequency spectrum is determined by means of the first absolute-value arrangement 22, for example by squaring. Finally, a power density function per time/frequency unit is thus obtained. An alternative way of obtaining this signal is to use a subband filtering arrangement for filtering the digital output signal, which subband filtering arrangement generates, after determining an absolute value, a signal parameter as a function of time and frequency in the form of the power density function per time/frequency unit. First converting arrangement 23 converts the power density function per time/frequency unit, for example, by resampling on the basis of a nonlinear frequency scale, also referred to as Bark scale, into a power density function per time/Bark unit, which conversion is described comprehensively in Appendix A of the Beerends et al publication, and first discounting arrangement 24 multiplies said power density function per time/Bark unit, for example by a characteristic, represented by means of a Bark spectrum, for performing an adjustment on a hearing function.

The components, shown in FIG. 3, of first compressing arrangement 4 are, as stated earlier, described adequately and in a manner known to the person skilled in the art in the Beerends et al publication. The power density function per time/Bark unit, adjusted to a hearing function, is multiplied by means of multiplier 32 by an exponentially decreasing signal such as, for example, $\exp\{-T/\tau(z)\}$. Here T is equal to 50% of the length of the window function and consequently represents half of a certain time interval, after which certain time interval first multiplying arrangement 20 always multiplies the output signal by a window function represented by means of a time spectrum (for example, 50% of 40 msec is 20 msec). In this expression, $\tau(z)$ is a characteristic which is represented by means of the Bark spectrum and is shown in detail in FIG. 6 of the article "A Perceptual Audio Quality Measure Based on a Psychoacoustic Sound Representation" by John G. Beerends and Jan A. Stemerdink, pp. 963–978, J. Audio Eng. Soc., Vol. 40, No. 12, December 1992 (and described relative thereto). First delay arrangement 34 delays the product of this multiplication by a delay time of length T, or half of the certain time interval. First nonlinear convolution arrangement 36 convolutes the signal supplied by a spreading function represented by means of a Bark spectrum, or spreads a power density function represented per time/Bark unit along a Bark scale, which is described comprehensively in Appendix B of the Beerends et al publication. First compressing unit 37 compresses the signal supplied in the form of a power density function represented per time/Bark unit with a function which, for example, raises the power density function represented per time/Bark unit to the power $\alpha$, where $0<\alpha<1$.

The components, shown in FIG. 4, of scaling circuit 3 can be formed in a manner known to the person skilled in the art. Further integrating arrangement 40 comprises, for example, two separate integrators which separately integrate the two series circuit signals supplied by means of a Bark spectrum, after which comparing arrangement 41 in the form of, for example, a divider, divides the two integrated signals by one another and feeds the division result or the inverse division result as control signal to further scaling unit 42. Unit 42 in the form of, for example, a multiplier or a divider, multiplies or divides the second series circuit signal by the division result or the inverse division result in order to make the two series circuit signals, viewed on average, of equal size. Ratio-determining arrangement 43 receives the first and the scaled second series circuit signal in the form of compressed, spread power density functions represented per time/Bark unit and divides them by one another to generate the further scaling signal in the form of the division result represented per time/Bark unit or the inverse thereof, depending on whether scaling unit 57 is constructed as multiplier or as divider.

The components, shown in FIG. 5, of first combining circuit 6 are, as stated earlier, described adequately and in a manner known to the person skilled in the art in the first reference, with the exception of the component 57 and a portion of component 54. Further comparing arrangement 50 comprises, for example, two separate integrators which separately integrate the two series circuit signals supplied over, for example, three separate portions of a Bark spectrum. Arrangement 50 comprises, for example, a divider which divides the two integrated signals by one another per portion of the Bark spectrum and feeds the division result or the inverse division result as scaling signal to scaling arrangement 52 which, in the form of, for example, a multiplier or a divider, multiplies or divides the respective series circuit signal by the division result or the inverse division result in order to make the two series circuit signals, viewed on average, of equal size per portion of the Bark spectrum. All this is described comprehensively in Appendix F of the Beerends et al publication. Differentiator 54 determines the difference between the two mutually scaled series circuit signals. According to the invention, if the difference is negative, this difference can then be augmented by a constant value and, if the difference is positive, the difference can be reduced by a constant value, for example by detecting whether it is less or greater than the value zero and then adding or subtracting the constant value. It is, however, also possible first to determine the absolute value of the difference by means of further absolute-value arrangement 56 and then to deduct the constant value from the absolute value, in which case a negative final result obviously must not be permitted to be obtained. In this last case, absolute-value arrangement 56 should be provided with a subtracting circuit. Furthermore, it is possible, according to the invention, to discount from the difference a portion of a series circuit signal in a similar manner instead of the constant value or together with the constant value. Integrator 58 integrates the signal originating from scaling unit 57 with respect to a Bark spectrum. Time-averaging arrangement 59 integrates the signal thus obtained with respect to a time spectrum. Consequently the quality signal is obtained which has a value which decresses, as the quality of the signal processing circuit increases.

As already described earlier, the correlation between the objective quality signal, to be assessed by means of the device according to the invention, and a subjective quality signal, to be assessed by human observers, is improved by four factors which can be viewed separately from one another:

the use of differential arrangement 54,56 which is provided with the third input for receiving a signal having a certain value, which signal should be deducted from the difference to be determined originally, the use of differential arrangement 54,56 which is provided with the third input for receiving a further signal derived from a series circuit signal having a further certain value, which further signal should be deducted from the difference to be determined originally.

the use of the scaling circuit 3 without making use of the ratio-determining arrangement 43 and scaling unit 57, and the use of the scaling circuit 3 with use being made of ratio-determining arrangement 43 and scaling unit 57.

The best correlation is obtained by simultaneous use of all the possibilities factors.

The widest meaning should be reserved for the term signal processing circuit, in which case, for example, all kinds of audio and/or video equipment can be considered. Thus, the signal processing circuit could be a codec, in which case the input signal is the reference signal with respect to which the quality of the output signal should be determined. The signal processing circuit could also be an equalizer, in which case the quality of the output signal should be determined with respect to a reference signal which is calculated on the basis of an already existing virtually ideal equalizer or is simply calculated. The signal processing circuit could even be a loudspeaker, in which case a smooth output signal could be used as a reference signal, with respect to which the quality of a sound output signal is then determined (scaling already takes place automatically in the device according to the invention). The signal processing circuit could furthermore be a loudspeaker computer model which is used to design loudspeakers on the basis of values to be set in the loudspeaker computer model, in which case a low-volume output signal of the loudspeaker computer model serves as the reference signal and in which case a high-volume output signal of the loudspeaker computer model then serves as the output signal of the signal processing circuit.

In the case of a calculated reference signal, the second signal processing arrangement of the second series circuit could be omitted as a result of the fact that the operations to be performed by the second signal processing arrangement can be discounted in calculating the reference signal.

What is claimed is:

1. Apparatus for determining quality of an output signal generated by a signal processing circuit with respect to a reference signal, the apparatus having a first series circuit having a first input for receiving the output signal, a second series circuit having a second input for receiving the reference signal, and a combining circuit, coupled to a first output of the first series circuit and to a second output of the second series circuit, for generating a quality signal, wherein the first series circuit comprises:

a first signal processing arrangement, coupled to the first input, for generating a first signal parameter as a function of time and frequency; and a first compressing arrangement, coupled to the first signal processing arrangement, for compressing a first signal parameter and for generating a first compressed signal parameter; and wherein the second series circuit comprises:

a second compressing arrangement, coupled to the second input, for generating a second compressed signal parameter; and wherein the combining circuit comprises:

a differential arrangement, coupled to the first and second compressing arrangements, for determining a difference signal on the basis of the first and second compressed signal parameters, the differential arrangement comprising an adjusting arrangement which reduces an amplitude of the difference signal by a predefined amount by either, in response to a sign of the difference signal, adding the predefined amount to the difference signal or subtracting the predefined amount therefrom, so as to yield a reduced difference signal; and an integrating arrangement, coupled to the differential arrangement, for generating the quality signal by integrating the reduced difference signal with respect to time and frequency.

2. The apparatus recited in claim 1 wherein the adjusting arrangement is coupled to either the first or second series circuits for reducing the amplitude of the difference signal in response to a signal produced by the first or second series circuits, respectively.

3. The apparatus recited in claim 1 further comprising a scaling circuit coupled to the first series circuit, the scaling circuit comprising:

a second integrating arrangement for generating a first integrated series circuit signal and a second integrated series circuit signal as a function of frequency, and a comparing arrangement, coupled to the second integrating arrangement, for generating a first scaled integrated series circuit signal in response to the first integrated series circuit signal.

4. The apparatus recited in claim 1 wherein the second series circuit further comprises:

a second signal processing arrangement, coupled to the second input of the second series circuit, for generating a second signal parameter as a function of time and frequency, wherein the second compressing arrangement is coupled to the second signal processing arrangement and generates the second compressed signal parameter in response to the second signal parameter generated by the second signal processing arrangement.

5. The apparatus recited in claim 4 wherein the second signal processing arrangement further comprising a subband filtering arrangement for filtering the reference signal so as to yield a filtered reference signal, and generating, through an absolute value of the filtered reference signal, a signal parameter as a function of time and frequency.

6. The apparatus recited in claim 4 wherein the second signal processing arrangement further comprises:

a multiplying arrangement generating a multiplied signal by multiplying said reference signal by a window function; and a transforming arrangement, coupled to the multiplying arrangement, for transforming the multiplied signal to the frequency domain, so as to yield a transformed multiplied signal, and for determining an absolute value of the transformed multiplied signal as a function of time and frequency.

7. The apparatus recited in claim 6 wherein the second signal processing arrangement further comprises a converting arrangement for converting the transformed multiplied signal represented by the time and frequency spectrums into a converted signal represented by both a time spectrum and a Bark spectrum.

8. The apparatus recited in claim 1 further comprising a scaling circuit coupled to the first and second series circuits, wherein the scaling circuit comprises:

a second integrating arrangement for generating, in response to the first and second compressed signal parameters, a first and second integrated series circuit signals, as a function of frequency; and a comparing arrangement, coupled to the second integrating arrangement, for generating a second scaled integrated series circuit signal in response to the first and second integrated series circuit signals.

9. The apparatus recited in claim 1 wherein the first signal processing arrangement further comprises:

a multiplying arrangement, coupled to the first input, for generating a multiplied signal by multiplying said output signal by a window function; and a transforming arrangement, coupled to the multiplying arrangement, for transforming the multiplied signal to the frequency domain so as to yield a transformed multiplied signal, and for determining an absolute value of the transformed multiplied signal as a function of time and frequency.

10. The apparatus recited in claim 9 wherein the first signal processing arrangement further comprises a converting arrangement for converting the transformed multiplied signal, represented by the time and frequency spectrums, into a converted signal, represented by a time spectrum and a Bark spectrum.

11. The apparatus recited in claim 1 wherein the first signal processing arrangement further comprises a sub-band filtering arrangement for filtering the reference signal so as to yield a filtered reference signal, and generating, through an absolute value of the filtered reference signal, a signal parameter as a function of time and frequency.

12. A method for determining quality of an output signal generated by a signal processing circuit with respect to a reference signal, the method comprising the steps of:

generating a first signal parameter as a function of time and frequency in response to the output signal;

compressing the first signal parameter so as to yield a first compressed signal parameter;

generating a second compressed signal parameter in response to the reference signal;

determining a difference signal in response to the first and second compressed signal parameters;

reducing an amplitude of the difference signal by a predefined amount by either, in response to a sign of the difference signal, adding the predefined amount to the difference signal or subtracting the predefined amount therefrom, so as to yield a reduced difference signal; and generating a quality signal by integrating the reduced difference signal with respect to time and frequency.

13. The method recited in claim 12 further comprising the step of reducing the amplitude of the difference signal in response to a first signal generated from the output signal.

14. The method recited in claim 12 further comprising the steps of:

generating an integrated first signal as a function of frequency in response to the output signal;

generating an integrated second signal as a function of frequency in response to the reference signal;

comparing the integrated first signal with the integrated second signal and, in response thereto, generating a comparison signal; and scaling, in response to the comparison signal, at least one of the integrated first signal and the integrated second signal.

15. The method recited in claim 12 wherein the second compressed signal parameter generating step comprises the steps of:

generating a second signal parameter in response to the reference signal, as a function of both time and frequency; and generating the second compressed signal parameter in response to said second signal parameter.

16. The method recited in claim 12 wherein the first signal parameter generating step comprises the steps of:

generating a first signal in response to the output signal;

multiplying, in the time domain, the first signal by a window function so as to yield a multiplied signal; and transforming the multiplied signal to a frequency domain so as to yield a transformed multiplied signal; and determining an absolute value of the transformed multiplied signal.

17. The method recited in claim 16 wherein the first signal parameter generating step further comprises the step of converting the first signal parameter, represented in the time and frequency spectrum, to a converted first signal parameter represented in the time and Bark spectrums.

18. The method recited in claim 12 further comprising the step of generating the first signal parameter, as a function of time and frequency, by filtering the output signal.

19. The method recited in claim 18 wherein the first signal parameter generating step further comprises the step of converting the first signal parameter, represented in the time and frequency spectrums, to a converted first signal parameter represented in the time and Bark spectrums.

20. The method recited in claim 12 further comprising the step of reducing an amplitude of the difference signal in response to a second signal generated from the reference signal.

* * * * *